Oct. 9, 1928.
O. G. WERNER
1,686,777
FORCED DRAFT PAN VALVE STRUCTURE
Filed Sept. 16, 1927
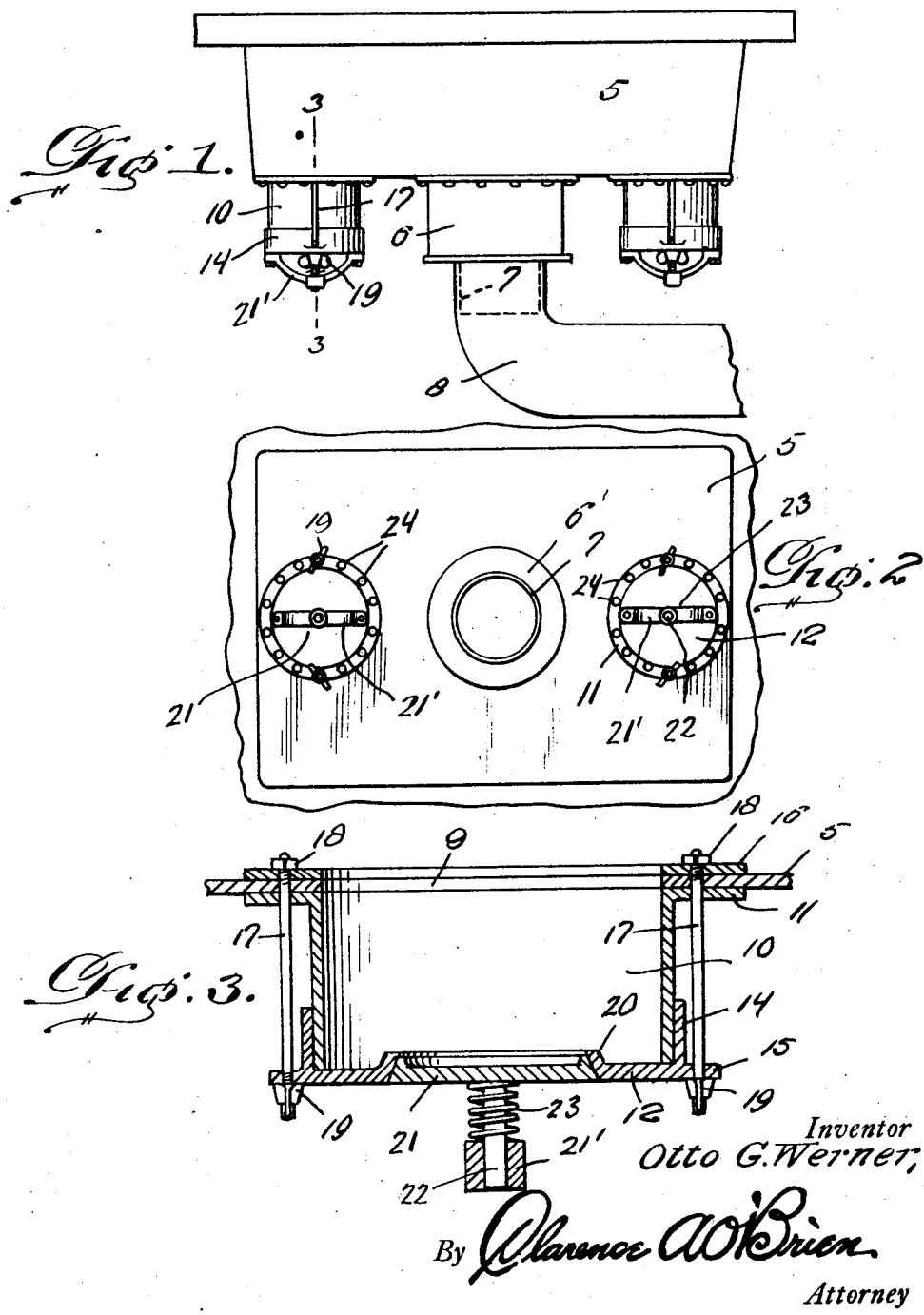
Inventor
Otto G. Werner,
By Clarence A. O'Brien
Attorney Patented Oct. 9, 1928.

1,686,777

UNITED STATES PATENT OFFICE.

OTTO G. WERNER, OF ROCHESTER, NEW YORK, ASSIGNOR TO JOHN C. WERNER, OF GENOA, OHIO.

FORCED-DRAFT-PAN VALVE STRUCTURE.

Application filed September 16, 1927. Serial No. 220,000.

The present invention relates to an improved valve structure for use in conjunction with a forced draft pan such as is shown in my pending application, Serial No. 37,737, filed June 17, 1926.

An important object of the invention is to provide a valve structure of this nature which is capable of being easily and quickly assembled and disassembled in respect to the forced draft pan structure.

Another important object of the invention lies in the provision of a valve of this nature which is exceedingly efficient and reliable in use, strong and durable, inexpensive to manufacture, compact, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter described and claimed.

In the drawing:—

Figure 1 is a side elevation of a forced draft pan showing my improved valve structures, associated therewith, Fig. 2 is a bottom plan view thereof, and Fig. 3 is an enlarged detail section through one of the valves.

Referring to the drawing in detail, it will be seen that 5 denotes the pan or bowl adapted to support a grate such as is disclosed clearly in my pending application above identified. A pipe 6 depends centrally from the bottom of the pan 5 and has a reduced terminal 7 over which may be received one end of an elbow 8 leading from a suitable source of forced draft. To each side of the pipe 6, the bottom of the pan is provided with an opening 9. A cylinder 10 is provided at its upper end with an outwardly extending annular flange 11. A plate 12 is provided with an annular collar 14 adapted to telescope over the other end of the cylinder 10 and has a pair of apertured ears 15 projecting radially therefrom at diametrically opposite points. A ring 16 is disposed on the bottom of the pan inside thereof for encircling the opening 9. The elongated bolts 17 pierce apertures in the ring 16, bottom of the pan 5, the flange 11, and the gears 15. Nuts 18 are threaded on the inner ends of the bolts 17 and wing nuts 19 are threaded on the exterior ends thereof.

Obviously, by tightening up on the nuts 19, the valve assembly may be secured tightly and firmly to the bottom of the pan. The plate 12 is formed with an upwardly projecting frusto-conical collar 20 forming a valve seat.

A valve plate 21 is provided with a frusto-conical periphery for association with the valve seat 20. A spider of bowed formation, as shown at 21' is attached to the plate 12 and extends across the center thereof. A stem 22 is slidable through a central opening provided in the spider 21' and is attached to the valve plate 21. A spring 23 is disposed about the valve stem 22 and impinges against the valve plate 21 and the spider 21' for normally holding the valve plate 21 closed so that it will open only in case of explosive pressure within the pan 5. It is to be noted that the flange 11 is securely riveted to the bottom pan as is indicated at 24. In order to obtain access to the interior of the pan, the valve structure proper may be very easily removed by taking off the thumb screws 19.

It is thought that the construction, operation, utility, and advantages of this invention will now be apparent to those skilled in this art without a more detailed description thereof. The present embodiment of the invention has been disclosed in detail, merely by way of example, since in actual practice it attains the features of advantage enumerated as desirable in the statement of the invention, and the above description. It is apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. In combination, a forced draft pan having a bottom provided with an opening, a cylinder attached to the bottom registering with the opening, a plate detachably mounted on the outer end of the cylinder, means for holding the plate in place, said plate being provided with a valve seat, a plate valve closable in said seat, a spider of bowed construction having its ends attached to said valve plate and provided with a central aperture, a valve stem extending from the valve plate through the aperture, and a spring disposed about the valve impinging against the valve plate and the spider.

2. In combination, a forced draft pan having a bottom provided with an opening, a cylinder having an annular flange projecting outwardly at one end, said flange being fixed to the bottom of the forced draft pan so that the cylinder registers with the opening, a plate at the other end of the cylinder, means for detachably engaging the plate on the cylinder, said plate being provided with a valve seat, a valve plate closable in the seat, a bowed guide having its ends attached to the valve seat plate and provided with an aperture, a stem extending from the valve plate through said aperture, and a spring disposed about the valve stem impinging against the valve plate and spider.

3. In combination, a forced draft pan having a bottom provided with an opening, a cylinder provided with an annular outwardly projecting flange at one end, means for attaching the flange to the bottom to register the opening with the interior of the cylinder, a valve seat plate having a cylindrical collar for telescoping over the other end of the cylinder, a valve plate associated with the same, and means for normally holding the valve plate closed on the valve seat plate.

4. In combination, a forced draft pan having a bottom provided with an opening, a cylinder provided with an annular outwardly projecting flange at one end, means for attaching the flanges to the bottom to register the opening with the interior of the cylinder, a valve seat plate having a cylindrical collar for telescoping over the other end of the cylinder, a valve plate associated with the same, means for normally holding the valve plate closed on the valve seat plate, apertured ears projecting from the valve seat plate, bolts piercing the apertured ears and piercing apertures in the flange and bottom, and thumb nuts on the outer ends of said bolts for securing the valve seats in place on the cylinder.

5. In combination, a forced draft pan having a bottom provided with an opening, a cylinder provided with an annular outwardly projecting flange at one end, means for attaching the flange to the bottom to register the opening with the interior of the cylinder, a valve seat plate having a cylindrical collar for telescoping over the other end of the cylinder, a valve plate associated with the same, means for normally holding the valve plate closed on the valve seat plate, apertured ears projecting from the valve seat plate, bolts piercing the apertured ears and piercing apertures in the flange and bottom, thumb nuts on the outer ends of said bolts for securing the valve seats in place on the cylinder, a bowed spider having its ends fixed to the valve seat plate, a valve stem extending from the valve plate through an aperture in the center of the spider, and a spring disposed about the valve stem and impinging against the spider and the valve plate.

6. In combination, a forced draft pan having a bottom provided with an opening, a ring inside the pan on the bottom surrounding the opening, a cylinder having at one end an outwardly projecting annular flange riveted to the bottom to register the cylinder with the opening, bolts piercing apertures in the flange, the bottom, and the ring, nuts on the ends of the bolts for securing the valve seats in place on the cylinder, a plate having a frusto-conical valve seat and provided with a cylindrical extension telescoping over the other end of the cylinder and provided with apertured ears pierced by the bolts, thumb nuts on the outer ends of the bolts, a valve plate having a frusto-conical periphery for association with the valve seat, a valve stem projecting from the valve plate, a bowed spider having its ends fixed to the valve seat plate, said valve stem piercing an aperture provided in the center of the spider, and a spring disposed about the valve stem impinging against the valve plate and the spider to hold the valve plate closed on the valve seat plate.

In testimony whereof I affix my signature.

OTTO G. WERNER.